United States Patent
Bravo Orellana

(10) Patent No.: US 12,051,152 B2
(45) Date of Patent: Jul. 30, 2024

(54) METHOD AND SYSTEM FOR GENERATING A COLORED TRIDIMENSIONAL MAP

(71) Applicant: OUTSIGHT, Paris (FR)

(72) Inventor: Raul Bravo Orellana, Paris (FR)

(73) Assignee: OUTSIGHT, Paris (FR)

( * ) Notice: Subject to any disclaimer, the term of this patent is extended or adjusted under 35 U.S.C. 154(b) by 34 days.

(21) Appl. No.: 17/790,658

(22) PCT Filed: Jan. 21, 2021

(86) PCT No.: PCT/EP2021/051308
§ 371 (c)(1),
(2) Date: Jul. 1, 2022

(87) PCT Pub. No.: WO2021/148522
PCT Pub. Date: Jul. 29, 2021

(65) Prior Publication Data
US 2023/0045287 A1 Feb. 9, 2023

Related U.S. Application Data

(60) Provisional application No. 62/965,742, filed on Jan. 24, 2020.

(51) Int. Cl.
*G06T 17/00* (2006.01)
*G01S 17/42* (2006.01)
(Continued)

(52) U.S. Cl.
CPC .............. *G06T 17/00* (2013.01); *G01S 17/42* (2013.01); *G01S 17/86* (2020.01); *G01S 17/87* (2013.01);
(Continued)

(58) Field of Classification Search
None
See application file for complete search history.

(56) References Cited

U.S. PATENT DOCUMENTS

| 10,436,884 B2 | 10/2019 | Wu et al. | |
| 2015/0319326 A1* | 11/2015 | Pfeiffer | H04N 1/00827 |
| | | | 358/474 |

(Continued)

FOREIGN PATENT DOCUMENTS

| EP | 3 438 777 | 6/2019 | |
| GB | 2563198 A * | 12/2018 | .......... B60W 30/143 |
| WO | 2018/091651 | 5/2018 | |

OTHER PUBLICATIONS

International Search Report for PCT/EP2021/051308, mailed Apr. 6, 2021, 3 pages.
(Continued)

*Primary Examiner* — Jwalant Amin
(74) *Attorney, Agent, or Firm* — NIXON & VANDERHYE

(57) ABSTRACT

A method for generating a colored tridimensional map of an environment surrounding a device, including the steps of receiving a first stream including a plurality of N point cloud frames from a tridimensional sensor, receiving a second stream including a plurality of M images from a camera, generating a global tridimensional map by merging the plurality of N point cloud frames in a reference coordinate system, and determining the colored tridimensional map by assigning a calculated color to each tridimensional data point of global tridimensional map, the calculated color being determined from color values of pixels of the plurality of M images.

20 Claims, 1 Drawing Sheet

(51) Int. Cl.
  *G01S 17/86* (2020.01)
  *G01S 17/87* (2020.01)
  *G01S 17/89* (2020.01)
  *G06T 7/70* (2017.01)
  *G06T 7/80* (2017.01)
  *G06T 7/90* (2017.01)

(52) U.S. Cl.
  CPC .............. *G01S 17/89* (2013.01); *G06T 7/70* (2017.01); *G06T 7/80* (2017.01); *G06T 7/90* (2017.01); *G06T 2207/10024* (2013.01); *G06T 2207/30244* (2013.01)

(56) References Cited

U.S. PATENT DOCUMENTS

| | | | | |
|---|---|---|---|---|
| 2018/0232947 | A1* | 8/2018 | Nehmadi | G01S 7/295 |
| 2019/0056492 | A1* | 2/2019 | Geiger | G01S 13/931 |
| 2022/0383585 | A1* | 12/2022 | Lee | G06T 15/08 |

OTHER PUBLICATIONS

Written Opinion of the ISA for PCT/EP2021/051308, mailed Apr. 6, 2021, 7 pages.

* cited by examiner

METHOD AND SYSTEM FOR GENERATING A COLORED TRIDIMENSIONAL MAP This application is the U.S. national phase of International Application No. PCT/EP2021/051308 filed Jan. 21, 2021 which designated the U.S. and claims priority to U.S. 62/965,742 filed Jan. 24, 2020, the entire contents of each of which are hereby incorporated by reference.

FIELD OF THE INVENTION

The present invention concerns a method for generating a colored tridimensional map of an environment surrounding a device. The device is for example a moving vehicle or an inspection system for scanning the environment.

BACKGROUND OF THE INVENTION

The present invention concerns more precisely a method for generating a colored tridimensional map of an environment surrounding a device, said method being implemented by:
  a processing unit,
  a tridimensional sensor and a camera mounted on said device at different locations and each one adapted to communicate with the processing unit.

The tridimensional sensor is for example a range sensor, like a light detection and ranging (LiDAR) which scans the environment using a rotating laser beam.

The camera is an optical image capture sensor.

The processing unit implementing the method is:
  receiving a first stream comprising a plurality of N point cloud frames from the tridimensional sensor, each point cloud frame comprising a set of tridimensional data points acquired by said tridimensional sensor, said tridimensional data points being representative of features located in the environment and viewed from first view point of location of the tridimensional sensor,
  receiving a second stream comprising a plurality of M images from the camera, each image being a matrix of pixels having color values corresponding to sensed light from features located in the environment and viewed from a second viewpoint of location of the camera.

In prior art methods and systems, to generate a colored tridimensional map, the pixel color values of an image is assigned or fused to a point cloud frame that is the one being the closest in time domain to the image. In other words, each image of the second stream is taken at an image time instant, and each point cloud frame from the tridimensional sensor is taken at a point cloud frame time instant. An image and its color pixels values are assigned to the point cloud frame having a point cloud frame time instant closest to the image time instant.

The colored tridimensional map is then the last point cloud frame (in time domain) colored by the closest image from the camera.

The colored tridimensional map generates a stream equivalent to the first stream of non-colored point cloud frames from the tridimensional sensor. Therefore, in such method the first stream is only colored by the color pixel values of one image at a time, on the fly.

However, in such method the colored tridimensional map stream has the same density of points than the first stream of point cloud frames from the tridimensional sensor. This density is poor as each point cloud frame is sparse, i.e. comprising a number of points that is low and that is insufficient to have a detailed representation of shapes all features included in the environment. This limit is more critical for real time methods and systems that must provide real time colored tridimensional maps of a dynamic environment in which features are moving inside the environment, and for which the movement detection of said features are important for the device (vehicle, scanning apparatus, . . . ).

Moreover, the color pixel values may change from one image to a next one because of various noise reasons. The luminosity in the environment may change from one time instant to another one, because of sunny/cloudy luminosity variations or because of displacement of features in the environment or because of displacement of shadows or lightings. The color pixel values in the images are therefore very sensitive to change in the environment. Consequently, applying such color values to the tridimensional data point may generate some troubles and discomforts to the user during the visualisation of a colored tridimensional map generated with said images.

OBJECTS AND SUMMARY OF THE INVENTION

A first object of the present invention is to provide a method for generating a colored tridimensional map of an environment surrounding a device, said method being implemented by:
  a processing unit,
  a tridimensional sensor and a camera mounted on said device at different locations and each one adapted to communicate with the processing unit, and
wherein the processing unit is
  receiving a first stream of N point cloud frames from the tridimensional sensor, as above disclosed,
  receiving a second stream of M images from the camera, as above disclosed, and
wherein the processing unit is also:
  generating a global tridimensional map by merging the tridimensional data points of the plurality of N point cloud frames in a reference coordinate system,
  determining the colored tridimensional map by assigning a calculated color to the tridimensional data point of global tridimensional map, said calculated color being determined from color values of pixels of the plurality of M images.

Thanks to these features, the colored tridimensional map is more dense (with more tridimensional data points than each point cloud frame) and the color values are more stable in time. Therefore, the experience for the user of viewing the colored tridimensional map is more satisfactory.

In various embodiments of the method, one and/or other of the following features may optionally be incorporated:

In one aspect of the method:
  for each image in the plurality of M images, color values of a plurality of pixels in the image are combined into a combined value, said plurality of pixels being near a pixel in the image corresponding to each tridimensional data point, and
  the calculated color of each tridimensional data point is determined on the bases of the combined values determined for said tridimensional data point.

In one aspect of the method, the calculated color is determined by:
projecting each tridimensional data point of global tridimensional map into a projected pixel in the plane of each image, and
determining the calculated color of each tridimensional data point by the color values of a plurality of pixels in the plurality of M images, said plurality of pixels being near the projected pixel.

In one aspect of the method, the plurality of pixels in the plurality of M images are at a distance lower than a limit distance from the projected pixel.

In one aspect of the method, the calculated color is determined by a weighted function of the plurality of pixels, and the weighed function weighting the color value of each pixel in the plurality by the distance of said pixel to the projected pixel.

In one aspect of the method, the weighted function is weighting the color value of each pixel in the plurality by a factor inversely proportional to the distance of said pixel to the projected pixel.

In one aspect of the method:
before determining the colored tridimensional map, the plurality of M images are processed by an image processing step including one or any combination of a process excluding extremal values, a spatial frequency domain bandpass filter, a convolution filter, a median filter, and an averaging filter, and
the calculated color is determined from color values of pixels in the images processed by the image processing step.

In one aspect of the method, a calibration process is established to determine the position and pose of the tridimensional sensor and the camera in the reference coordinate system, before merging tridimensional data points of point cloud frames PCF into the global tridimensional map In one aspect of the method, the calibration process is a Simultaneous Localization and Mapping (SLAM) method.

In one aspect of the method, the tridimensional sensor is a range sensor chosen among a light detection and ranging (LiDAR) sensor.

A second object of the invention is to provide a system for generating a colored tridimensional map of an environment surrounding a device, the system comprising:
a processing unit,
a tridimensional sensor and a camera mounted on said device at different locations and each one adapted to communicate with the processing unit, and
wherein the processing unit is processing the method as above defined.

BRIEF DESCRIPTION OF THE DRAWINGS

Other features and advantages of the invention will be apparent from the following detailed description of two of its embodiments given by way of non-limiting example, with reference to the accompanying drawings. In the drawings.

MORE DETAILED DESCRIPTION

Figure 1:
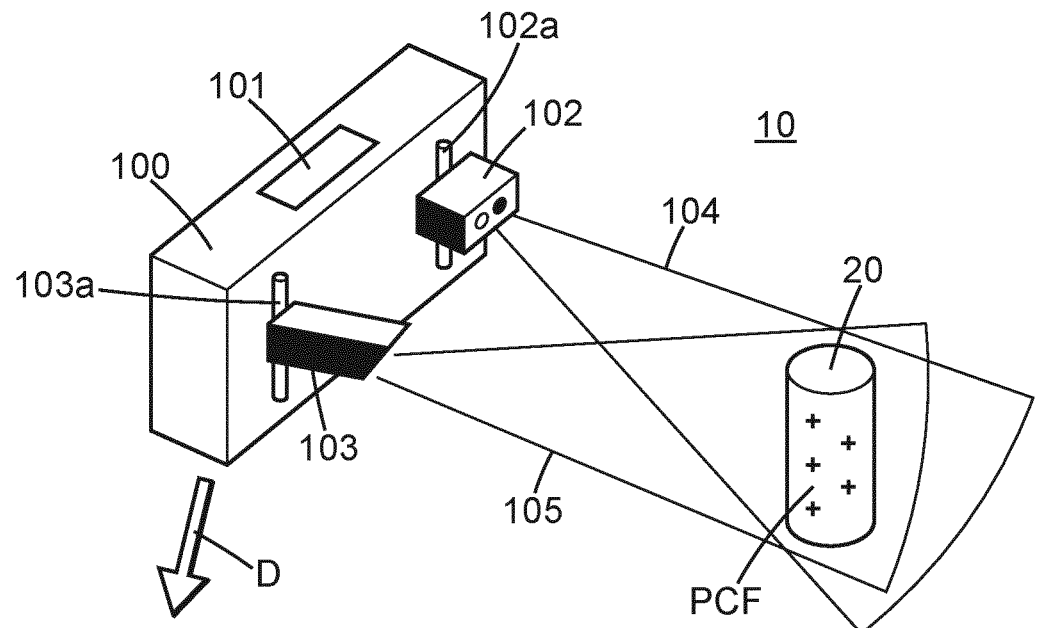
FIG. 1 is a schematic view illustrating the system for generating a colored tridimensional map according to the method of the present disclosure.

FIG. 1 illustrates an apparatus/system for generating a colored tridimensional map, comprising:
a processing unit 101,
a tridimensional sensor 102 mounted on a device 100, for example via a first mount 102a,
a camera 103 mounted on the device 100, for example via a second mount 103a.

The tridimensional sensor 102 is for example a range sensor measuring, in a plurality of directions from the tridimensional sensor, distances between said tridimensional sensor 102 and any reflective feature 20 inside the environment 10.

The tridimensional sensor 102 is for example a light detection and ranging (LiDAR) which scans the environment using a rotating laser beam. In a variant, the tridimensional sensor 102 is a radar or sonar.

Such tridimensional sensor 102 generates a first stream comprising a plurality of point cloud frames PCF, each point cloud frame comprising a set of tridimensional data points. A tridimensional data point is a set of three (3) coordinates representing a location of a points sensed on the feature 20 in the environment. These coordinates may be given in any type coordinate system (Cartesian, polar), and for example in a coordinate system that is local to the tridimensional sensor 102; i.e. a local coordinate system that is referenced to the location of the tridimensional sensor 102.

We will consider that the first stream includes a plurality of N point cloud frames PCF, N being the number of point cloud frames in the plurality. The number N of point cloud frames PCF is greater than one; i.e. there are two or more point cloud frames. For example, N is greater than ten (10), and N may be greater than twenty (20). The first stream includes therefore lots of tridimensional data from environment at various time instants.

We will assume that each one of this point cloud frames PCF is taken at a point cloud frame time instant $t_{PCF}$. Optionally, the tridimensional data points in a point cloud frame are scanned successively during a short time range around after and/or before the point cloud frame time instant $t_{PCF}$. In present disclosure, we will assume for simplicity that all points in a point cloud frame PCF are simultaneously scanned at said point cloud frame time instant $t_{PCF}$.

The plurality of point cloud frames PCF in the first stream is scanned at a plurality of N successive point cloud frame time instants.

As illustrated on FIG. 1, the tridimensional sensor 102 has a first field of view 104. This first field of view 104 may have a substantially conic shape from the location of tridimensional sensor 102 towards the feature 20 inside the environment 10.

The camera 103 is an optical image capture sensor that generates a second stream comprising a plurality of images. Each image is for example a matrix of pixels having color values corresponding to the sensed light reflected from features 20 in the environment 10.

BY "color values of a pixel", it is understood in present description that a pixel is assigned to data that can represent an intensity as a grey scale, or a real color for example coded as red, green, blue components values or coded with any other coded components.

As illustrated on FIG. 1, the camera 103 has a second field of view 105. The second field of view 105 may have a substantially conic shape from the location of camera 103 towards the feature 20 inside the environment 10.

The tridimensional sensor 102 and the camera 103 are located at different locations on the device 100 and they are oriented substantially to view the same feature 10: the first field of view 104 and the second field of view 105 intersect in the environment substantially at the location of the feature 20. Then, at least some points in the point cloud frame PCF can be assigned to pixels in the image from camera 103 (if they can be seen from the camera). Then, the tridimensional point can be colored by the color value of pixel in the image corresponding to the tridimensional point.

The second stream includes a plurality of M images, M being the number of images in the plurality. The number M of images is greater than one; i.e. there are two or more images. For example, M is greater than ten (10), and M may be greater than twenty (20). The second stream includes therefore lots of pixels and color data from environment at various time instants.

The plurality of images in the second stream may be taken at a plurality of M successive image time instants $t_1$.

The N point cloud frame instants $t_{PCF}$ are in general different than the M image time instants $t_1$. All these instants are included into a common time period DT in which all data from tridimensional sensor 102 (point cloud frames) and from the camera 103 (images) will be analysed together. The common time period DT is for example a time window that is shifted in time, so that the analysis takes into account the data from sensors (102, 13) in past only inside this shifted time period. In that way, the analysis is updated with most recent data.

According to a variant, the processing unit 101 may synchronise the tridimensional sensor 102 and the camera 103 to have at least some data from both devices at common time instants.

During the processing, the device 100 is preferably moved into the environment 10, as illustrated in FIG. 1 by the arrow D corresponding to a displacement of the device 100. Both sensors, the tridimensional sensor 102 and the camera 103, then may scan the feature 20 from various point of views and/or can scan various tridimensional points on the feature 20.

Figure 2:
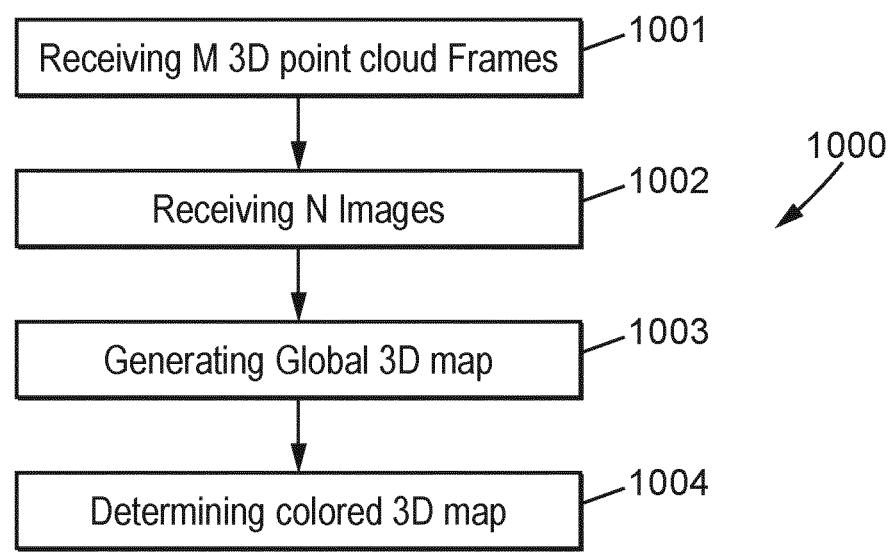
FIG. 2 is a flow chart diagram illustrating the method according to the present disclosure.

FIG. 2 illustrates the flow chart of method 1000 for generating a colored tridimensional map of the environment surrounding the device. The processing unit 101 is:
    receiving the first stream (step 1001) of a plurality of N point cloud frames (PCF) from the tridimensional sensor 102, and
    receiving the second stream (step 1002) of a plurality of M images from the camera 103.
In the method according to present disclosure, the processing unit 101 is further:
    generating a global tridimensional map (step 1003) by merging the tridimensional data points of the plurality of N point cloud frames, in a reference coordinate system.

The merging of the tridimensional data points of the plurality of N point cloud frames is converting the tridimensional data points from each point cloud frame PCF (in local coordinate system) into tridimensional data points in a reference coordinate system. The reference coordinate system is needed as the device (and sensors) is moving, and the tridimensional data points in local coordinate system must be converted into a not-moving coordinate system, the reference coordinate system.

The reference coordinate system may be coordinate system of any sensor (tridimensional sensor, camera) or a coordinate system of the device 100, said coordinate system being taken at a given or initial time instant $t_0$.

Optionally, the reference coordinate system may be any coordinate system of environment 10.

The step 1003 may uses geometry transformation operators to convert each point cloud frame PCF from local coordinate system to the reference coordinate system before merging into the global tridimensional map. Then, the global tridimensional map accumulates the (converted) tridimensional data points from the N point cloud frames. Therefore, the global tridimensional map much more points than one point cloud frame. If the device 100 moves into the environment 10, we can guess to have up to N more points into the global tridimensional map than into one point cloud frame from the tridimensional sensor 102. Then, the global tridimensional map includes a set of tridimensional points that is not spare and that is dense.

The geometry transformation may be predetermined and stored in a memory of the processing unit. The geometry transformation may be determined by various calibration processes. The calibration process may use position and orientation sensors. The calibration process may use target markers in the environment.

For example, if the tridimensional sensor 102 provides point cloud frames PCF at a rate of 20 Hz, and the number N of point cloud frames accumulated is equal to forty (40), which corresponds to a time period DT of two (2) seconds, the number of points into the global tridimensional map may multiplied by a factor of 40 compared to the number of tridimensional data points into one point cloud frame PCF. Such cloud of point becomes dense into the environment 10. For example, if the above tridimensional sensor 102 is measuring 1024 points at each frame, the global tridimensional map may include up to 40960 different tridimensional data points. The above values are only given as illustration for understanding.

In the method according to present disclosure, the processing unit 101 is further:
    determining the colored tridimensional map (step 1004) by assigning a calculated color to each one of the tridimensional data points of global tridimensional map, said calculated color for a tridimensional data point being determined from color values of pixels of the plurality of M images.

Contrary to prior art methods that use only one image (i.e. the closest image in time domain to a specific point cloud frame), the step 1004 of the method uses a plurality of images from the tridimensional sensor 102 to determine the calculated image color. Therefore, the present method is taking into account time domain variations of color values corresponding to a tridimensional data point to determine the calculated color.

According to an embodiment, the calculated color may be also determined for a tridimensional data point from color values of a plurality of pixels in an image of the plurality of M images. Said plurality of pixels is defined as being around a pixel corresponding to a tridimensional data point.

In other words, the method is processing as follow:
    for each image in the plurality of M images, color values of a plurality of pixels in the image are combined into a combined value, said plurality of pixels being near or around a pixel in the image corresponding to each tridimensional data point, and
    the calculated color of each tridimensional data point is determined on the bases of the combined values determined for said tridimensional data point.

Thanks to this feature, the method is also taking into account spatial variations of color values around a pixel corresponding to a tridimensional data point to determine the calculated color. The method is therefore taking into account both time domain and spatial variations of color values of pixels in the images to determine the calculated color.

According to an embodiment, the processing unit is projecting each tridimensional point of global tridimensional map into a projected pixel in the plane of each image. In that process, the projection is different for each image as the device 100 (i.e. the camera 103) may move between each image. This means that the projected pixel coordinate from one image to another image for the same tridimensional data point are different. In that way, the processing unit 101 is determining one projected pixel in each image of the plurality of M images.

The calculated color may be determined by the color values of pixels in the images of the plurality of M images that are near each projected pixel of the corresponding image. In other words, for each image in the plurality of M images, the processing unit 101 may use the color values of a plurality of pixels in the image near the projected pixel of said image.

According to an embodiment, the calculated color may be determined as a mean value of color values of the pixels in the plurality of M images near the projected pixel in each image. In other words, the calculated color is determined by firstly determining a first mean value of color value near a projected pixel for a predetermined image in the plurality of M images: This first mean value corresponds to a spatial averaging. Such spatial averaging may be processed by any method, such as image processing methods. Then, the calculated color is determined by a second mean value that is a mean value of the first mean values determined for all the M images: The second mean value corresponds to a time domain averaging. The calculated color is then equal to function of said second mean value.

According to an embodiment, the pixels in an image near a projected pixel may be selected by a distance between said pixel in the image and the projected pixel in the same image. The distance may be calculated by any distance formula, such as the square root of the sum of the coordinate's differences squares. In an alternative, the square root is not implemented in the distance formula. In an alternative, the absolute of coordinate's differences are used to compute the distance. The pixels in the image are near the projected pixel if the distance of each pixel is lower than a distance limit, said distance limit being a predetermined parameter of the method. The distance limit may be expressed as a pixel size unity. For example, pixels at a distance lower than ten (10) pixels are selected and their color values are used to determine the calculated color.

According to an embodiment, the pixels in an image near a projected pixel may be selected by an image mask applied around the projected pixel.

According to an embodiment, the calculated color is determined by a weighted function of the color values of the pixels in the plurality of M images that are near each projected pixel in said images. For example, the weighted function is a function giving more weight to pixels that are close to the projected pixel than the pixels than are more distant to the projected pixel. In an alternative, the weight in the weighted function is a inversely proportional to the distance between a pixel in the image and the projected pixel.

According to an embodiment, the calculated color is determined, more generally in comparison to the previous methods, by applying to the M images an image processing step including one or any combination of the following steps: a step of excluding extremal values in an image, a spatial frequency filter, a convolution filter, a median filter, a median filter, an averaging filter.

Each one of the above filter may be determined for each image of the plurality of M images on the bases of the projected pixel.

A plurality of filters having various filter parameters may be also applied successively to the images of the plurality.

According to an embodiment, a calibration process is established to determine the positions and orientations of the tridimensional sensor 102 and the camera 103 in the reference coordinate system, before merging tridimensional data points of point cloud frames PCF into the global tridimensional map.

For example, the calibration process determines the geometry transformation on the bases the previously known global tridimensional map and the new point cloud frames. It may identify common tridimensional data points in the global tridimensional map and in the new point cloud frame. As the tridimensional data points in the global tridimensional map are known in reference coordinate system, the coordinates of other points in the new point cloud frame are then deduced and/or the geometry transformation is deduced for any further calculation.

An example of such method is disclosed in the patent application no WO 2018/091651.

The calibration process therefore uses tridimensional data points from same feature 20 in the environment, and detected from a plurality of different first field of views 104. The plurality of first field of views 104 are at least partially overlapping so that there are some common tridimensional data points in the plurality of point cloud frames PCF from the tridimensional sensor 102.

The calibration process is for example a Simultaneous Localization and Mapping (SLAM) method.

According to an embodiment, the apparatus/system may also include position and orientation sensors fixed on the device 100 and communicating to the processing unit the position and orientation of the device 100. Then, the geometry transformation from the local coordinate system to the global coordinate system is known, and used to convert the tridimensional data point of point cloud frame PCF to the tridimensional data point in the global tridimensional map.

According to an embodiment, the calibration process may use target markers in the environment to determine the position and orientation of the device 100. Then, the geometry transformation from the local coordinate system to the global coordinate system is known, and used to convert the tridimensional data point of point cloud frame PCF to the tridimensional data point in the global tridimensional map.

The invention claimed is:

1. A method for generating a colored tridimensional map of an environment surrounding a device, the method being implemented by a processor and a tridimensional sensor and a camera mounted on said device at different locations and each one configured to communicate with the processor, the method comprising:

receiving, by the processor, a first stream comprising a plurality of N point cloud frames from the tridimensional sensor, each point cloud frame comprising a set of tridimensional data points acquired by said tridimensional sensor, said tridimensional data points being representative of features located in the environment and viewed from first view point of location of the tridimensional sensor;

receiving, by the processor, a second stream comprising a plurality of M images from the camera, each image being a matrix of pixels having color values corresponding to sensed light from features located in the environment and viewed from a second viewpoint of location of the camera;

generating, by the processor, a global tridimensional map by merging the tridimensional data points of the plurality of N point cloud frames in a reference coordinate system; and determining the colored tridimensional map by assigning a calculated color to the tridimensional data points of the global tridimensional map, said calculated color being determined from color values of selected pixels of each respective image of the plurality of M images.

2. The method according to claim 1, further comprising:

for each of the images in the plurality of M images, combining the color values of the selected pixels of the plurality of pixels in the respective image into a combined value, said selected pixels of the plurality of pixels being neighboring pixels that are near a pixel in the image corresponding to each tridimensional data point, wherein the calculated color of each tridimensional data point is determined based on the combined values determined for said tridimensional data point.

3. The method according to claim 2, wherein, before determining the colored tridimensional map, the plurality of M images are processed by an image processing operation including one or any combination of a process excluding extremal values, a spatial frequency domain bandpass filter, a convolution filter, a median filter, and an averaging filter, and the calculated color is determined from color values of pixels in the images processed by the image processing operation.

4. The method according to claim 2, further comprising establishing a calibration process to determine the position and pose of the tridimensional sensor and the camera in the reference coordinate system, before merging tridimensional data points of point cloud frames PCF into the global tridimensional map.

5. The method according to claim 1, wherein the calculated color is determined by:

projecting each tridimensional data point of global tridimensional map into a projected pixel in the plane of each image, and determining the calculated color of each tridimensional data point by the color values of a plurality of pixels in the plurality of M images, said plurality of pixels being near the projected pixel.

6. The method according to claim 5, wherein the plurality of pixels in the plurality of M images are at a distance lower than a limit distance from the projected pixel.

7. The method according to claim 6, wherein the calculated color is determined by a weighted function of the plurality of pixels, and the weighed function weighting the color value of each pixel in the plurality by the distance of said pixel to the projected pixel.

8. The method according to claim 6, wherein, before determining the colored tridimensional map, the plurality of M images are processed by an image processing operation including one or any combination of a process excluding extremal values, a spatial frequency domain bandpass filter, a convolution filter, a median filter, and an averaging filter, and the calculated color is determined from color values of pixels in the images processed by the image processing operation.

9. The method according to claim 6, further comprising establishing a calibration process to determine the position and pose of the tridimensional sensor and the camera in the reference coordinate system, before merging tridimensional data points of point cloud frames PCF into the global tridimensional map.

10. The method according to claim 5, wherein the calculated color is determined by a weighted function of the plurality of pixels, and the weighed function weighting the color value of each pixel in the plurality by the distance of said pixel to the projected pixel.

11. The method according to claim 10, wherein the weighted function is weighting the color value of each pixel in the plurality by a factor inversely proportional to the distance of said pixel to the projected pixel.

12. The method according to claim 11, wherein, before determining the colored tridimensional map, the plurality of M images are processed by an image processing operation including one or any combination of a process excluding extremal values, a spatial frequency domain bandpass filter, a convolution filter, a median filter, and an averaging filter, and the calculated color is determined from color values of pixels in the images processed by the image processing operation.

13. The method according to claim 10, wherein, before determining the colored tridimensional map, the plurality of M images are processed by an image processing operation including one or any combination of a process excluding extremal values, a spatial frequency domain bandpass filter, a convolution filter, a median filter, and an averaging filter, and the calculated color is determined from color values of pixels in the images processed by the image processing operation.

14. The method according to claim 5, wherein, before determining the colored tridimensional map, the plurality of M images are processed by an image processing operation including one or any combination of a process excluding extremal values, a spatial frequency domain bandpass filter, a convolution filter, a median filter, and an averaging filter, and the calculated color is determined from color values of pixels in the images processed by the image processing operation.

15. The method according to claim 5, further comprising establishing a calibration process to determine the position and pose of the tridimensional sensor and the camera in the reference coordinate system, before merging tridimensional data points of point cloud frames PCF into the global tridimensional map.

16. The method according to claim 1, wherein, before determining the colored tridimensional map, the plurality of M images are processed by an image processing operation including one or any combination of a process excluding extremal values, a spatial frequency domain bandpass filter, a convolution filter, a median filter, and an averaging filter, and the calculated color is determined from color values of pixels in the images processed by the image processing operation.

17. The method according to claim 1, further comprising establishing a calibration process to determine the position and pose of the tridimensional sensor and the camera in the reference coordinate system, before merging tridimensional data points of point cloud frames PCF into the global tridimensional map.

18. The method of claim 17, wherein the calibration process is a Simultaneous Localization and Mapping method.

19. The method according to claim 1, wherein the tridimensional sensor is a range sensor chosen among a light detection and ranging sensor.

20. A system for generating a colored tridimensional map of an environment surrounding a device, the system comprising:
- the processor configured to process the method of claim 1; and
- a tridimensional sensor and a camera mounted on said device at different locations and each one configured to communicate with the processor.

* * * * *